(12) United States Patent
Kim et al.

(10) Patent No.: US 7,387,527 B2
(45) Date of Patent: Jun. 17, 2008

(54) PLUGGABLE OPTICAL TRANSCEIVER MODULE

(75) Inventors: Jong Deog Kim, Gwangjoo (KR); Mun Seob Lee, Daejeon (KR); Sung Woong Park, Gyeonggi-do (KR); Dong Soo Lee, Gwangjoo (KR); Bin Yeong Yoon, Daejeon (KR); Byung Tak Lee, Gyeonggi-do (KR)

(73) Assignee: Electronics and Telecommunications Research Insttute, Daejeon (KR)

( * ) Notice: Subject to any disclaimer, the term of this patent is extended or adjusted under 35 U.S.C. 154(b) by 0 days.

(21) Appl. No.: 11/451,118

(22) Filed: Jun. 12, 2006

(65) Prior Publication Data

US 2007/0123090 A1    May 31, 2007

(30) Foreign Application Priority Data

Nov. 30, 2005    (KR) ...................... 10-2005-0115893

(51) Int. Cl.
*H01R 13/64* (2006.01)
(52) U.S. Cl. ..................................... 439/372
(58) Field of Classification Search ............... 439/372, 439/490, 157, 160, 352; 385/92, 53, 88; 361/728, 732
See application file for complete search history.

(56) References Cited

U.S. PATENT DOCUMENTS

| | | | |
|---|---|---|---|
| 6,457,992 B2 * | 10/2002 | Posey et al. | 439/490 |
| 6,762,940 B2 | 7/2004 | Zaremba | |
| 6,786,653 B1 * | 9/2004 | Hwang et al. | 385/92 |
| 6,789,958 B2 | 9/2004 | Ahrens et al. | |
| 6,887,092 B2 * | 5/2005 | Minota | 439/372 |
| 7,108,523 B2 * | 9/2006 | Hartman | 439/157 |
| 7,118,281 B2 * | 10/2006 | Chiu et al. | 385/53 |
| 2003/0156801 A1 | 8/2003 | Hwang | |
| 2003/0194190 A1 | 10/2003 | Huang | |
| 2005/0003696 A1 | 1/2005 | Shirk et al. | |

FOREIGN PATENT DOCUMENTS

| | | |
|---|---|---|
| JP | 10-246842 | 9/1998 |
| JP | 2004-125861 | 4/2004 |
| KR | 1020040025202 | 3/2004 |

* cited by examiner

*Primary Examiner*—Alexander Gilman
(74) *Attorney, Agent, or Firm*—Ladas & Parry LLP

(57) ABSTRACT

A pluggable optical transceiver module is provided. The pluggable optical transceiver module is fitted to and removed from a receptacle having a clamp at an end in an optical communication system body and includes a housing frame having an adaptor at which a light emitting diode (LED) display unit and an optical transceiver element are installed; a rotary lever comprising a handle at one side and a pressing portion at another side so that the rotary lever rotates by a predetermined angle with respect to one side of the housing frame; and an elastic arm which is pivoted on the housing frame to be rotated by the rotary lever and includes one end contacting the pressing portion according to rotation of the rotary lever and another end coupled with or separated from the clamp of the receptacle by the rotation.

17 Claims, 10 Drawing Sheets

PLUGGABLE OPTICAL TRANSCEIVER MODULE

CROSS-REFERENCE TO RELATED PATENT APPLICATIONS

This application claims the benefit of Korean Patent Application No. 10-2005-0115893, filed on Nov. 30, 2005, in the Korean Intellectual Property Office, the disclosure of which is incorporated herein in its entirety by reference.

BACKGROUND OF THE INVENTION

1. Field of the Invention

The present invention relates to an optical transceiver module for an optical communication system, and more particularly, to a pluggable optical transceiver module which can be fit into or removed from a receptacle formed at the platform of an optical communication system.

2. Description of the Related Art

In optical communication, optical transceiver modules having both functions of transmitting and receiving an optical signal have been developed in various forms and have recently been standardized to a small and thin shape. In particular, a pluggable optical transceiver module is a standard suggested in the newest one among related multisource agreements (MSAs), which include a small form-factor pluggable (SFP)-MSA used for a transfer rate of 2.5 Gbps or less and a 10 gigabit small form-factor pluggable (XFP)-MSA used for a transfer rate of about 10 Gbps.

A pluggable optical transceiver module conforming to the SFP-MSA usually has a structure for receiving a duplex-LC connector used in a long-distance network. With the spread of an access network afterward, it is anticipated that the pluggable optical transceiver module has a form of a single optical fiber with a bi-directional optical transmission function.

An SFP optical transceiver module has an optical receptacle for fiber connector or a pigtailed fiber at one end and an electrical male connector at another end. The SFP optical transceiver module is mechanically and electrically coupled with an optical communication system through a electrical receptacle and a cage on the system board for preventing electromagnetic interface(EMI). Such pluggable method in which the optical transceiver module is coupled to the platform of the optical communication system is more convenient for test measurement and replacement than a method of fixing an optical transceiver module through soldering. In addition, pluggable electric connector is more advantageous in transmitting a high speed signal than a conventional pin-type connector.

The SFP MSA defines mechanical and electrical standards that should be complied with for an optical transceiver module, a cage assembly and an electrical connector, which are provided to fit the optical transceiver module to a platform of an optical communication system, so that compatibility can be accomplished regardless of manufactures and users. However, even if optical transceiver modules are the same SFP types, individual products may have different characteristics, merits, and demerits according to their manufacturers. In particular, since the SFP MSA was published on Sep. 14, 2000, various patents about a method of easily detaching an optical transceiver module from a cage assembly or a method of manufacturing and assembling a cage have been applied and registered.

Moreover, SFP optical transceiver modules may be connected using various types of connectors such as LC, SC, MT-RJ, BNC/TNC, and fiber channel or a fiber pigtail for interface with an outside. This allows that the SFP MSA is applied in various application fields. Also various types of optical transceiver modules and driving circuit boards may be combined internally. Accordingly, different SFP packages are manufactured and used according to the structure of parts included therein and the form of a connector.

SUMMARY OF THE INVENTION

The present invention provides a pluggable optical transceiver module which can be fitted to and removed from a receptacle included in a circuit platform of an optical communication system.

The present invention also provides a pluggable optical transceiver module for visually displaying electrical connection and optical transmitting/receiving states using a light emitting diode (LED) when it is fitted to a receptacle included in a circuit platform of an optical communication system.

The present invention also provides a pluggable optical transceiver module having a housing frame which is coupled with various types of fiber connector and optical elements in an SFP package with minimized additional package parts.

According to an aspect of the present invention, there is provided a pluggable optical transceiver module which is slidingly fitted to and removed from a receptacle having a clamp in an system platform. The pluggable optical transceiver module includes a housing frame having an adaptor at which an optical transceiver element is installed; a rotary lever comprising a handle at one side and a pressing portion at another side so that the rotary lever rotates by a predetermined angle with respect to one side of the housing frame; and an elastic arm which is pivoted on the housing frame to be rotated by the rotary lever and includes one end contacting the pressing portion according to rotation of the rotary lever and another end coupled with or separated from the clamp of the receptacle by the rotation.

According to another aspect of the present invention, there is provided a pluggable optical transceiver module which is fitted to and removed from an system platform. The pluggable optical transceiver module includes a housing frame having an adaptor at which an optical transceiver element is installed, a driving circuit board controlling operations of the optical transceiver element, and a display unit displaying a state of connection between the driving circuit board and a terminal of the optical communication system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
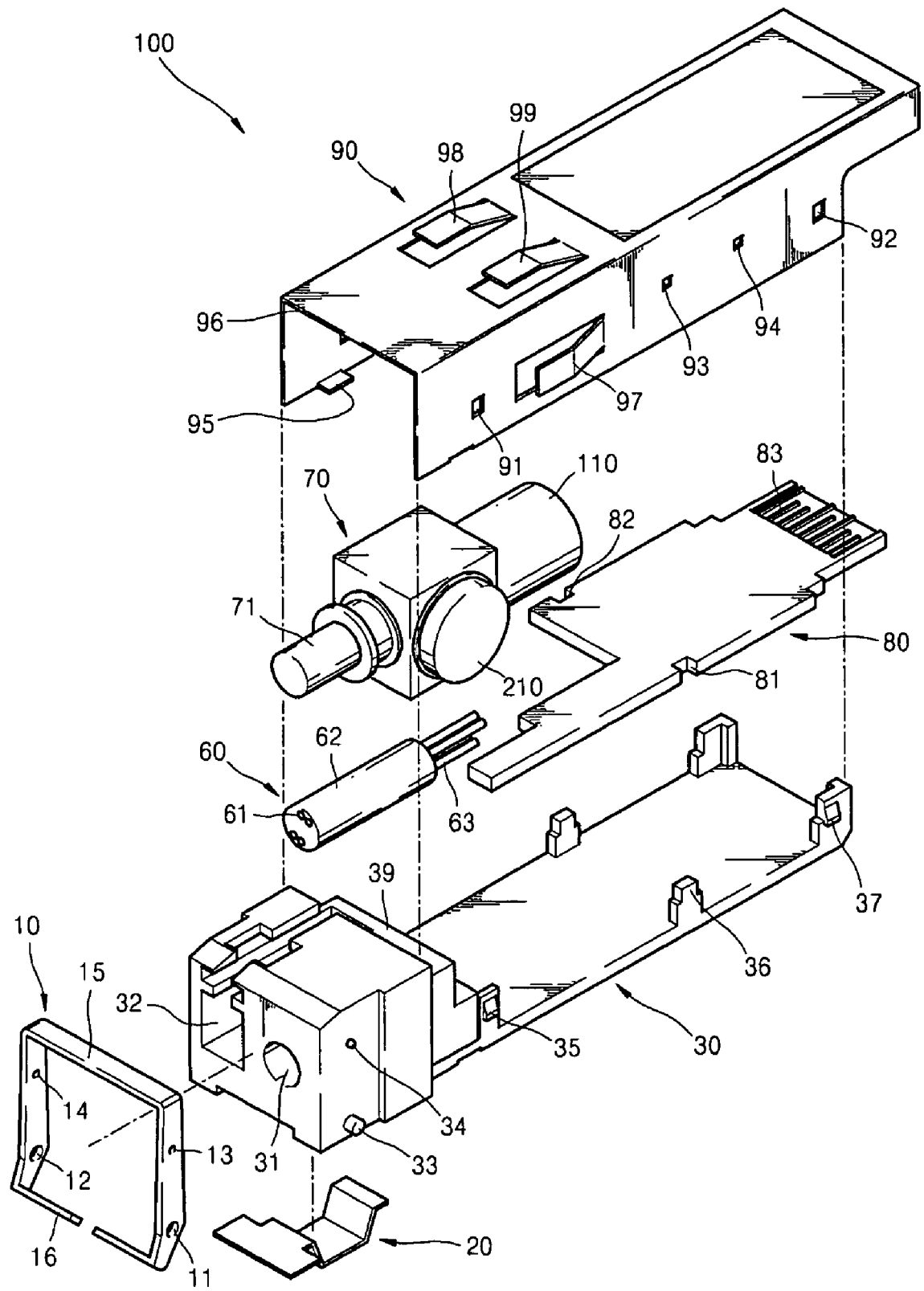
FIG. 1 is an exploded perspective view of a pluggable optical transceiver module according to an embodiment of the present invention.

FIG. 1 is an exploded perspective view of a pluggable optical transceiver module 100 according to an embodiment of the present invention. The pluggable optical transceiver module 100 can be fitted to and removed from a platform of an optical communication system and includes an optical input/output terminal 71.

Referring to FIG. 1, the pluggable optical transceiver module 100 includes a rotary lever 10, an elastic arm 20, a housing frame 30, a display unit 60, an optical transceiving device 70, a driving circuit board 80, and a cover 90.

The rotary lever 10 and the elastic arm 20 are assembled to the housing frame 30, and then, the display unit 60, the optical transceiving device 70, the driving circuit board 80, and the cover 90 are assembled thereto.

A first latch 35 and a second latch 37 protruding outward from the housing frame 30 are inserted into a first groove 91 and a second groove 92, respectively, formed in one side of the cover 90 so that the housing frame 30 and the cover 90 are assembled firmly. A third groove 93 and a fourth groove 94 protruding inward from the one side of the cover 90 presses an edge of the driving circuit board 80 when the housing frame 30 and the cover 90 are assembled so that the driving circuit board 80 is settled.

An upper front portion 96 of the cover 90 tightly contact an upper front portion 39 of the housing frame 30. A keeper 95 formed at a lower front portion of the cover 90 keeps the housing frame 30 from moving up and down. In addition, keeping plates 97, 98, and 99 of the cover 90 keep the pluggable optical transceiver module 100 from moving when the pluggable optical transceiver module 100 is fitted to a receptacle included in a platform of an optical communication system.

Although not shown, the first through fourth grooves 91, 92, 93, and 94 are formed on an opposite side of the cover 90.

A first hole 11 formed at one side of the rotary lever 10 is coupled with a first protrusion 33 formed at one side of the housing frame 30 and a second hole 12 formed at an opposite side of the rotary lever 10 is coupled with another protrusion (not shown) formed at an opposite side of the housing frame 33, so that the protrusion 33 and the other protrusion act as a pivot.

A third hole 13 formed at one side of the rotary lever 10 is coupled with a second protrusion 34 formed at one side of the housing frame 30 and a fourth hole 14 formed at an opposite side of the rotary lever 10 is coupled with another protrusion (not shown) formed at an opposite side of the housing frame 30, so that the rotary lever 10 can be fixed when necessary. Here, the second protrusion 34 and the corresponding protrusion formed at the opposite sides, respectively, of the housing frame 30 may have a hemispheric shape so that the rotary lever 10 can be easily made free from the housing frame 30 and can rotate when necessary.

A handle 15 is formed at an upper side of the rotary lever 10 to allow a user to rotate the rotary lever 10 by a predetermined angle. A pressing portion 16 pressing the elastic arm 20 is formed at a lower side of the rotary lever 10.

The optical transceiving device 70 integrates an optical transmitting device 110 and an optical receiving device 210 in one package. The optical transceiving device 70 transmits an optical signal and receives an optical signal through the optical input/output terminal 71. The optical transceiving device 70 is connected with the driving circuit board 80 in terms of a circuit.

The display unit 60 displays a state of connection with a platform of an optical communication system and operation states of the optical transmitting device 110 and the optical receiving device 210 and includes a display window 61, a column 62, and an electric pin 63. In detail, the display unit 60 is a light emitting diode (LED) assembly including a transmission LED displaying a transmitting function and a reception LED displaying a receiving function and includes the column 62 used as a mount, the display window 61 through which the LEDs emit light, and the electric pin 63 electrically connected with the driving circuit board 80.

The driving circuit board 80 is connected with the optical transceiving device 70 and the display unit 60 and controls them to perform predetermined operations. The driving circuit board 80 includes keeping grooves 81 and 82 at opposite sides, respectively, to be coupled with keeping projections 36 and 38, respectively, formed at the housing frame 30 and an electric connector terminal 83 connected to the platform of the optical communication system.

The housing frame 30 includes a fiber adaptor 32 receiving the optical input/output terminal 71 of the optical transceiving device 70 therein and a fiber connector and a display unit adaptor 31 receiving the display unit 60 therein.

The elastic arm 20 is pivoted on the bottom of the housing frame 30, which will be described in detail with reference to FIG. 2A or 2B later.

Figure 2A:
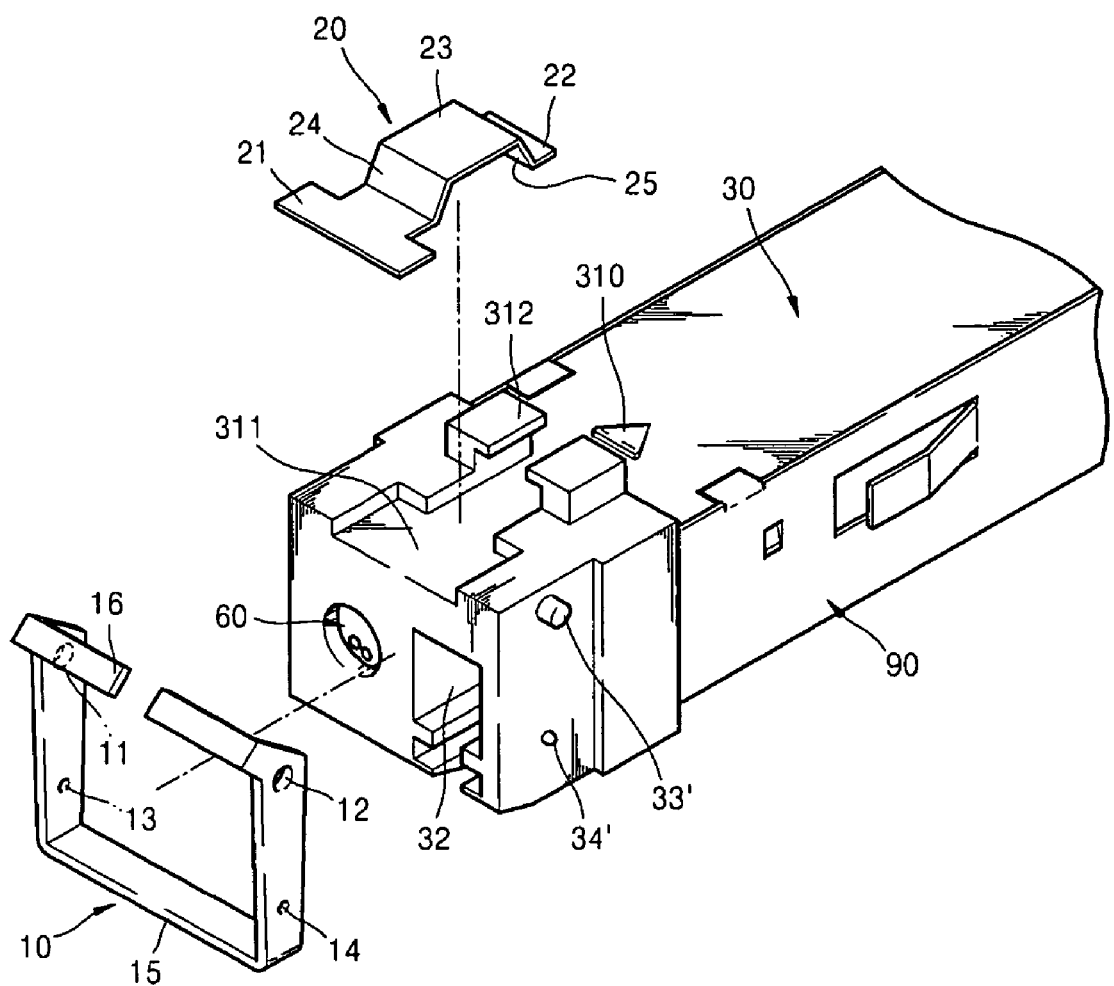
FIG. 2A is a bottom view illustrating that an elastic arm is pivoted on a housing frame in the pluggable optical transceiver module shown in FIG. 1.

FIG. 2A is a bottom view illustrating that the elastic arm 20 is pivoted on the housing frame 30 in the pluggable optical transceiver module 100 shown in FIG. 1. FIG. 2A shows the bottom of the housing frame 30, the rotary lever 10, and the elastic arm 20, which are used to fit the pluggable optical transceiver module 100 to and remove it from a receptacle included in a platform of an optical communication system.

A first hole and a second hole (11 and 12) formed at both sides, respectively, of the rotary lever 10 are coupled with a first protrusion 33 and a third protrusion 33' formed at both sides, respectively, of the housing frame 33, so that they all act as a pivot. The third protrusion 33' is formed on a side opposite to a side on which the first protrusion 33 is formed and performs the same function as the first protrusion 33.

A third groove 13 and a fourth groove 14 formed in the rotary lever 10 are coupled with a second protrusion 34 and a fourth protrusion 34', respectively, formed at both sides, respectively, of the housing frame 30 so that the rotary lever 10 is fixed to the housing frame 30 when the pluggable optical transceiver module 100 is fitted to the receptacle included in the platform of the optical communication system. The fourth protrusion 34' is formed on a side opposite to a side on which the second protrusion 34 is formed and performs the same function as the second protrusion 34.

The elastic arm 20 is pivoted on the housing frame 30 so that the elastic arm 20 rotates in association with the rotary lever 10. The elastic arm 20 has an end formed to contact a pressing portion 16 of the rotary lever 10 according to the rotation of the rotary lever 10 and another end fitted to or removed from a receptacle clamp included in the platform of the optical communication system by the rotation.

In detail, the elastic arm 20 is implemented as a plate spring in which an elastic portion is bended upward in a ladder shape. The elastic arm 20 includes a first plane 21, a second plane 22, a third plane 23, a first inclining plane 24, and a second inclining plane 25.

The first plane 21 and the second plane 22 of the elastic arm 20 contact the bottom of the housing frame 30 and the third plane 23 of the elastic arm 20 lightly contacts a fixing sill 312 of the housing frame 30.

The fixing sill 312 contacts the third plane 23 of the elastic arm 20 so that the pluggable optical transceiver module 100 is fixed to and pivoted on the receptacle of the system platform in a direction perpendicular to a direction (hereinafter, referred to as a "sliding direction) in which the pluggable optical transceiver module 100 slides into the receptacle. In addition, the fixing sill 312 is caught at an entrance of the receptacle of the system platform when the pluggable optical transceiver module 100 is fitted to the receptacle.

The first plane 21 of the elastic arm 20 is positioned to tightly contact a groove 311 formed at a position where the rotary lever 10 is connected in the housing frame 30. The first inclining plane 24 of the elastic arm 20 is placed at a position at which the pressing portion 16 of the rotary lever 10 can contact the first inclining plane 24.

The elastic arm 20 is coupled to the bottom of the housing frame 30 such that the pluggable optical transceiver module 100 is fixed in the direction perpendicular to the sliding direction and is movable in a predetermined range in the sliding direction.

The groove 311 of the housing frame 30 has a shape of "T" to receive the first plane 21 of the elastic arm 20 and to stop the first inclining plane 24 in a predetermined range when the first inclining plane 24 is pressed by the pressing portion 16 of the rotary lever 10.

A coupling protrusion 310 of the housing frame 30 allows the pluggable optical transceiver module 100 is fixed to the receptacle of the system platform. A portion of the coupling protrusion 310 close to the receptacle of the system platform is low and a portion of the coupling protrusion 310 apart from the receptacle is high so that the coupling protrusion 310 has a slope with respect to the bottom of the housing frame 30 to allow the pluggable optical transceiver module 100 to be easily fixed to and released from the receptacle.

Figure 2B:
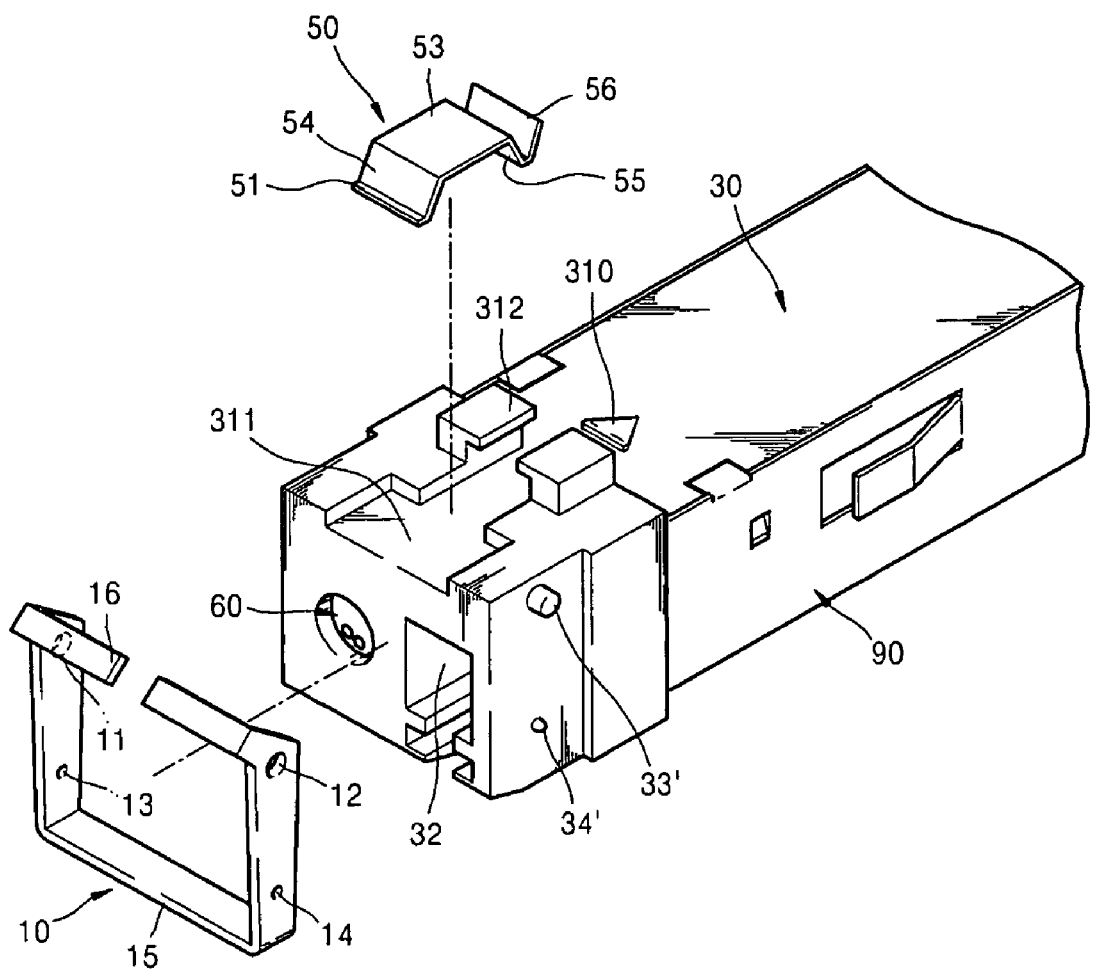
FIG. 2B is a bottom view illustrating that an elastic arm different from that shown in FIG. 2A is pivoted on the housing frame in the pluggable optical transceiver module shown in FIG. 1.

FIG. 2B is a bottom view illustrating that an elastic arm 50 different from that shown in FIG. 2A is pivoted on the housing frame 30. Referring to FIG. 2B, the elastic arm 50 includes a first plane 51, a third plane 53, a first inclining plane 54, a second inclining plane 55, and a third inclining plane 56. In the drawings, the same reference numerals denote the same members.

The first plane 51 and a portion of the elastic arm 50 where the second inclining plane 55 meets the third inclining plane 56 contact the bottom of the housing frame 30. The third plane 53 lightly contacts the fixing sill 312 of the housing frame 30. The second inclining plane 55 and the third inclining plane 56 together form a shape of "V" with respect to the housing frame 30.

Figure 6:
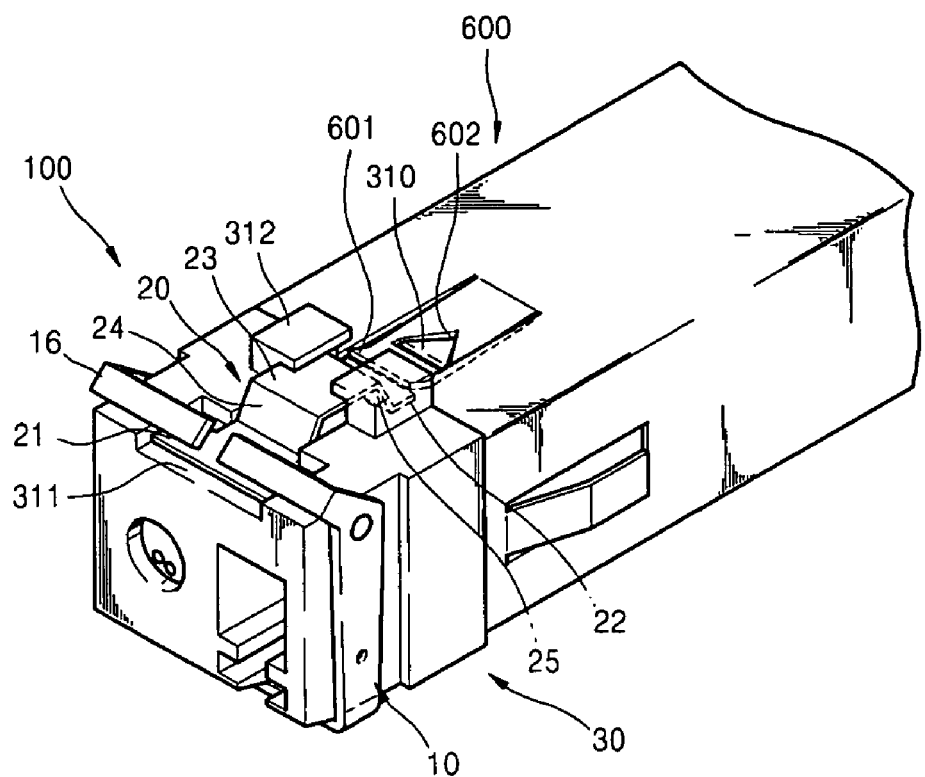
FIG. 6 illustrates a state where a pluggable optical transceiver module according to an embodiment of the present invention is fitted to a system platform.

When the rotary lever 10 rotates, the elastic arm 50 moves to the coupling protrusion 310 and the third inclining plane 56 pushes up a clamp 601 of a receptacle 600 shown in FIG. 6. As a result, an opening 602 of the receptacle 600 is separated from the coupling protrusion 310 so that the pluggable optical transceiver module 100 is released from the receptacle 600. Here, the operation is performed in such way that the locomotive power of the elastic arm 50 induced by the rotary lever 10 combines with the elastic power of the third inclining plane 56. The features described above with reference to FIG. 2A will be referred to for other features of the elastic arm 50.

Figure 3:
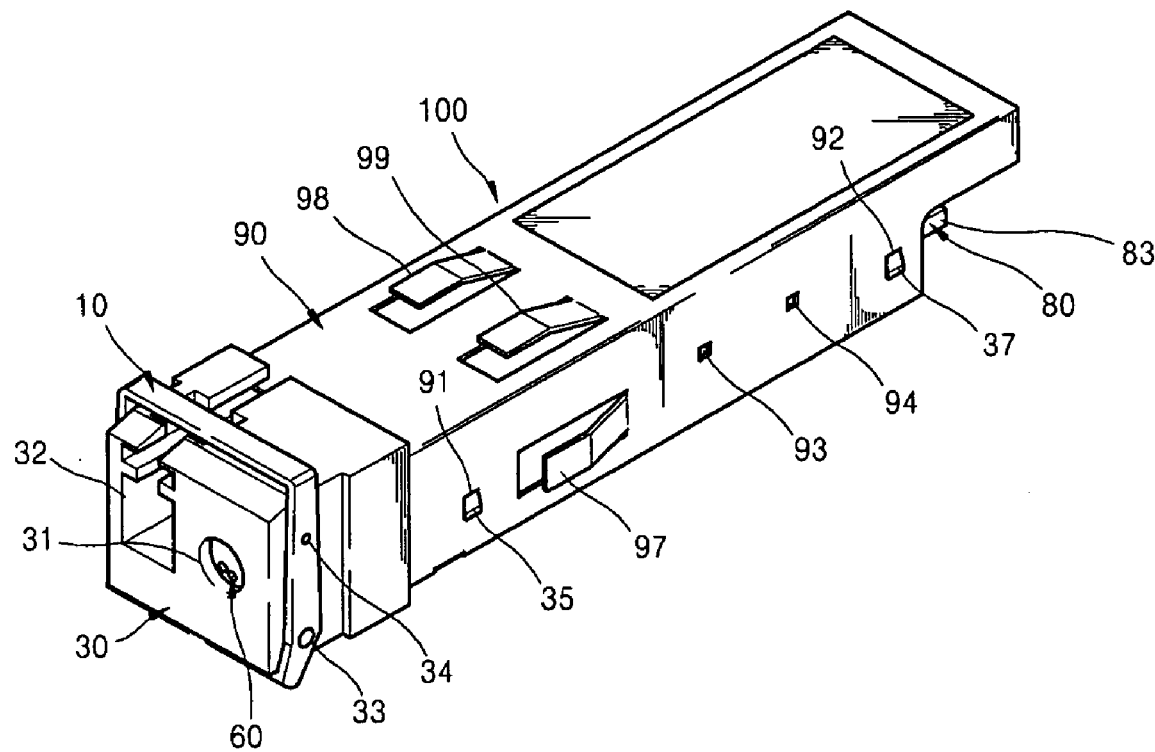
FIG. 3 illustrates the assembly of the pluggable optical transceiver module shown in FIG. 1.

FIG. 3 illustrates the assembly of the pluggable optical transceiver module 100 shown in FIG. 1. Referring to FIG. 3, the rotary lever 10 and the elastic arm 20 are coupled to the housing frame 30 and then the display unit 60, the optical transceiving device 70, the driving circuit board 80, and the cover 90 are assembled and fixed thereto.

The first groove 91 and the second groove 92 of the cover 90 are respectively coupled with the first latch 35 and the second latch 37 of the housing frame 30. In addition, the rotary lever 10 is coupled with the first and second protrusions 33 and 34 of the housing frame 30.

Figure 4:
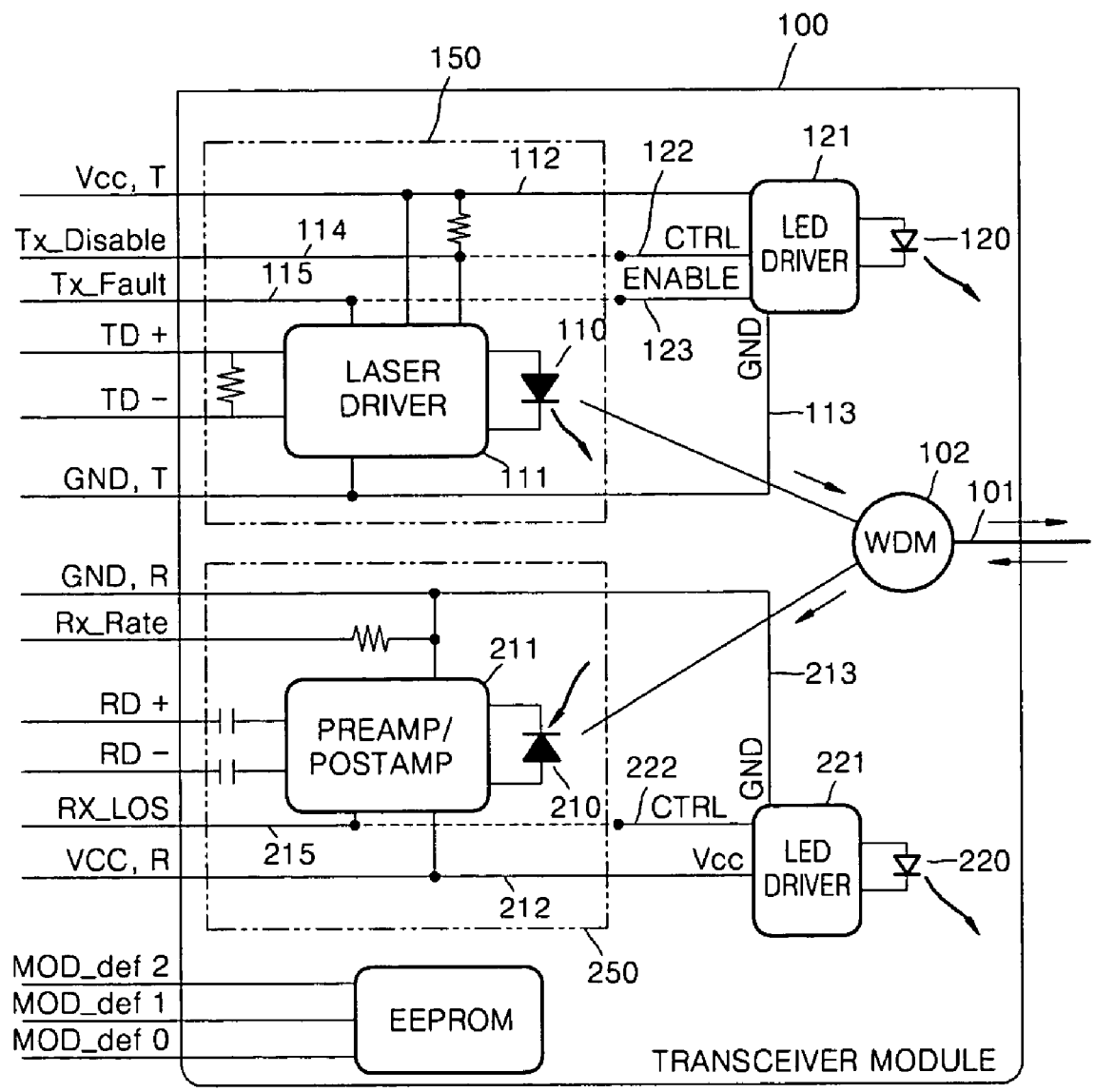
FIG. 4 is a circuit diagram illustrating the operations of an optical transceiving device and a display unit in the pluggable optical transceiver module shown in FIG. 1.

FIG. 4 is a circuit diagram illustrating the operations of the optical transceiving device 70 and the display unit 60 in the pluggable optical transceiver module 100 shown in FIG. 1. Referring to FIG. 4, external electrical interface lines and a driving circuit including an optical transmitter 150 and an optical receiver 250 are the same as those in a typical optical transceiver module. The functions and names of signal lines for electrical interface are the same as those defined in the small form-factor pluggable multisource agreement (SFP-MSA) pin definitions.

In the pluggable optical transceiver module 100, an optical transmitting signal having a particular wavelength is output from the optical transmitting device 110 is connected to an optical input/output terminal 101 through a wavelength division multiplexer (WDM) 102 and an optical receiving signal having a different wavelength is input from the optical input/output terminal 101 is input to the optical receiving device 210 through the WDM 102. Generally, the optical input/output terminal 101 is implemented as an optical receptacle including a single fiber pigtail or a single fiber ferrule.

Hereinafter, a method of installing an LED in an optical transceiver module without hindering the function of the typical optical transceiver module and the standards for a pluggable optical transceiver module to allow a user to visually check the driving state will be described.

A transmission LED 120 for displaying a state of the optical transmitter 150 is driven by an LED driver 121 and is connected to a supply voltage (Vcc) terminal 112 for driving the optical transmitter 150 and a ground (GND) terminal 113 to visually display whether the supply voltage is normally applied to the optical transmitter 150. Here, other optional functions may be added through an enabling terminal 123 and a control (CTRL) terminal 122. The enabling terminal 123 can turn on or off the transmission LED 120 according to a level of an input voltage and may be connected to a Tx_Fault terminal 115 of the optical transmitter 150 to indicating as case in which the optical transmitter 150 does not operate due to faults other than power supply. In this situation, the transmission LED 120 may be turned on even when the supply voltage is applied and the state of the optical transmitter 150 is normal. The CTRL terminal 122 may be connected together with a pulse generation circuit to a Tx_Disable signal 114, an input signal of an optical transceiver module used to shut-down an output of the optical transmitter 150 when necessary, in order to display the enabling state of the optical transmitter 150 by pulsing the transmission LED 120.

Similar to the transmission LED 120, a reception LED 220 for displaying a state of the optical receiver 250 is connected to a Vcc terminal 212 and a GND terminal 213 to visually display whether a supply voltage is normally applied to the optical receiver 250.

For an optional function, a CTRL terminal 222 may be connected to an RX_LOS terminal 215 indicating whether the state of the optical receiver 250 is normal to display whether data is being received.

Only to display whether the supply voltage is applied to the optical transmitter 150, the transmission LED 120 may be directly connected to the Vcc terminal 112 for driving the optical transmitter 150 and the GND terminal 113 without using the LED driver 121.

The transmission LED 120 and the reception LED 220 displaying whether the supply voltage is normally applied to the optical transmitter 150 and the optical receiver 250, respectively, are particularly useful by allowing an operator to immediately check an electrical contact failure when the pluggable optical transceiver module 100 is fitted to the receptacle of system platform. In addition, the LEDs 120 and 220 can display the states of the pluggable optical transceiver module 100 with other optional functions during the normal operation.

Although a case where displaying LEDs are used in a bidirectional optical transceiver using two wavelengths has been described with reference to FIG. 4, such display mechanism using LEDs may also be used for duplex optical transceiver modules using dual LC-connector and triplexer-type optical transceiver modules using three different wavelengths with two WDM filter.

The display unit 60 is an LED assembly including the transmission LED 120 displaying a transmission function and the reception LED 220 displaying the receiving function. As shown in FIG. 1, the transmission LED 120 and the reception LED 220 are assembled in a form of a surface-mount device (SMD) on the display window 61 disposed on the column 62 and are electrically connected to a driving board through the electric pin 63. Alternatively, the display unit 60 may be structured such that SMD LEDs are mounted on the driving circuit board 80 and light emitted from the SMD LEDs are transmitted to the display window 61 through the column 62 used as a waveguide without the electric pin 63. Alternatively, the display unit 60 may be structured such that SMD LEDs are mounted on the optical receptacle side of the driving circuit board 80 and light emitted from the SMD LEDs are displayed through the transparent optical receptacle such as 900 in FIG. 9, or 1000 in FIG. 10.

Figure 5:
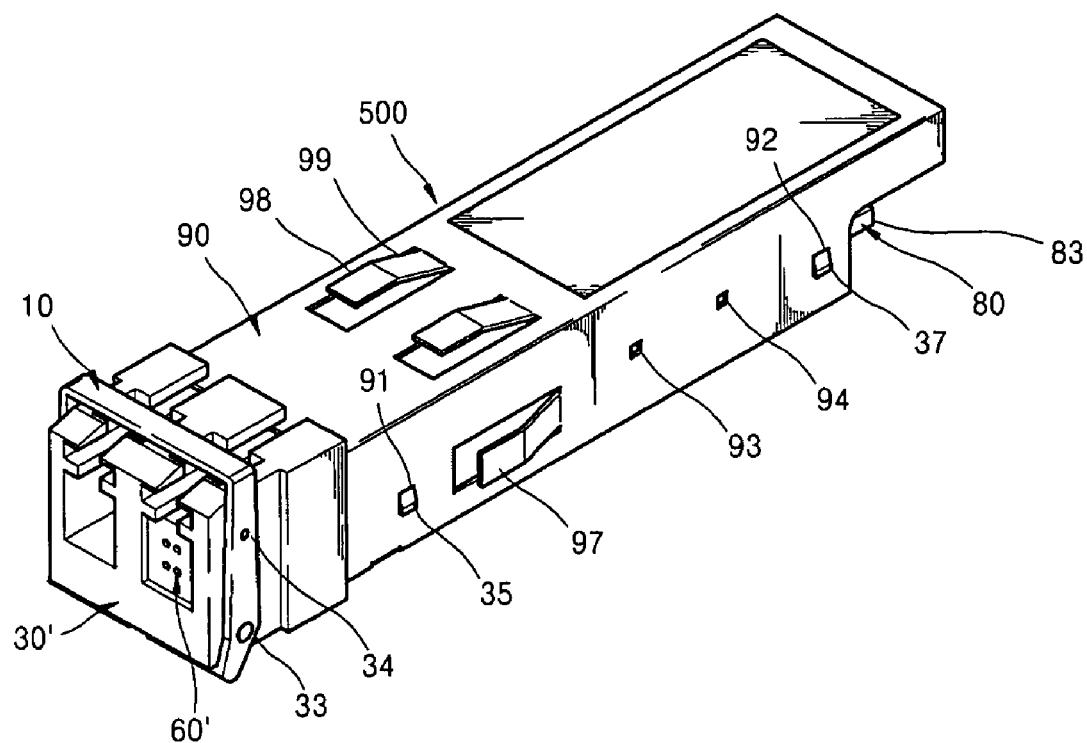
FIG. 5 illustrates the assembly of a pluggable optical transceiver module according to another embodiment of the present invention.

FIG. 5 illustrates the assembly of a pluggable optical transceiver module 500 according to another embodiment of the present invention. Referring to FIG. 5, the pluggable optical transceiver module 500 includes a housing frame 30' having a dual LC adaptor. The pluggable optical transceiver module 500 shown in FIG. 5 is the same as the pluggable optical transceiver module 100 shown in FIG. 1 or 3, with the exception that the housing frame 30' is different from the housing frame 30 shown in FIG. 1 or 3.

The housing frame 30' of the pluggable optical transceiver module 500 shown in FIG. 5 has two LC adaptors. A display unit 60' is installed at one of the two LC adaptors. The display unit 60' has a tetragonal shape.

When the housing frame 30' having the dual LC adaptor is developed and used, it will be preferable that other conventional parts are used without additional investment for a new SFP optical transceiver module. When the optical transceiving device 70 having an appropriate size is used, one side of the dual LC adaptor is used for the optical input/output terminal 71 of the optical transceiving device 70 and the other side is used for the display unit 60'.

FIG. 6 illustrates a state where the pluggable optical transceiver module 100 is fitted to an system platform. FIG. 6 illustrates a view from the bottom when the pluggable optical transceiver module 100 having the elastic arm 20 and the rotary lever 10 is fitted to a receptacle 600 of the system platform.

The receptacle 600 includes a clamp 601 at an entrance and an opening 602 at the center of the clamp 601. The opening 602 has the same shape as the coupling protrusion 310 and is positioned to couple with the coupling protrusion 310 when the pluggable optical transceiver module 100 is fitted to the receptacle 600. The clamp 601 slants to the inside of the receptacle 600 at a predetermined angle so that the pluggable optical transceiver module 100 is easily fitted to and removed from the receptacle 600.

The fixing sill 312 of the housing frame 30 is formed to be caught at the entrance of the receptacle 600 so that the pluggable optical transceiver module 100 is prevented from advancing into the receptacle 600 any more after it is caught at the entrance of the receptacle 600.

Figure 7:
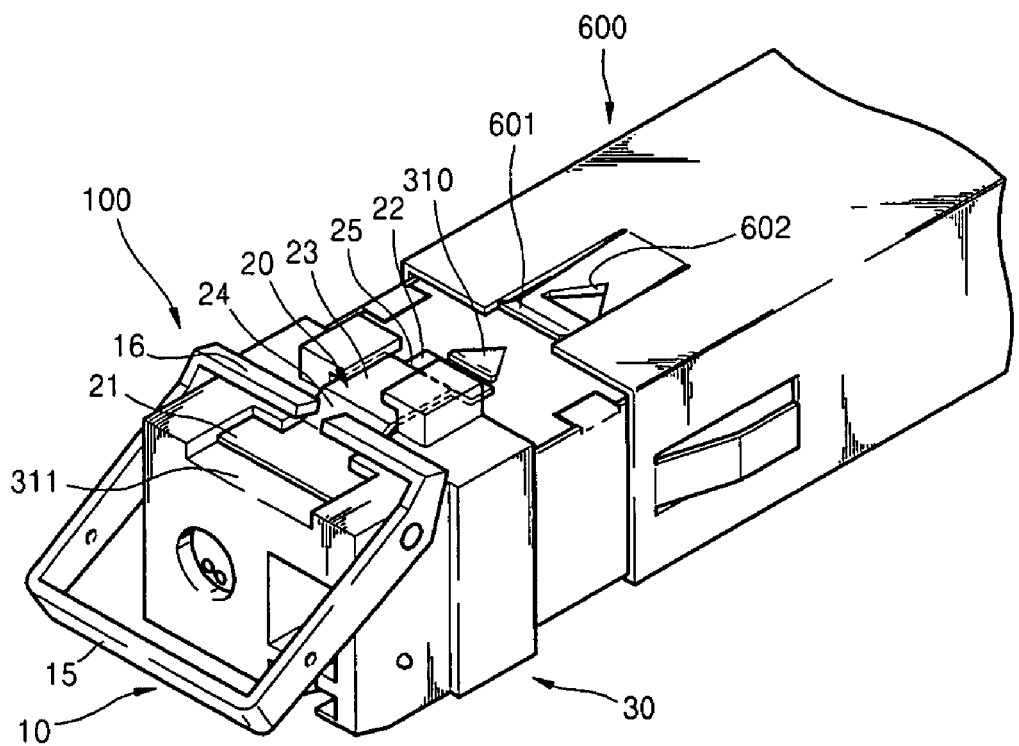
FIG. 7 illustrates a state where the pluggable optical transceiver module shown in FIG. 6 is being removed from the system platform.
Figure 8:
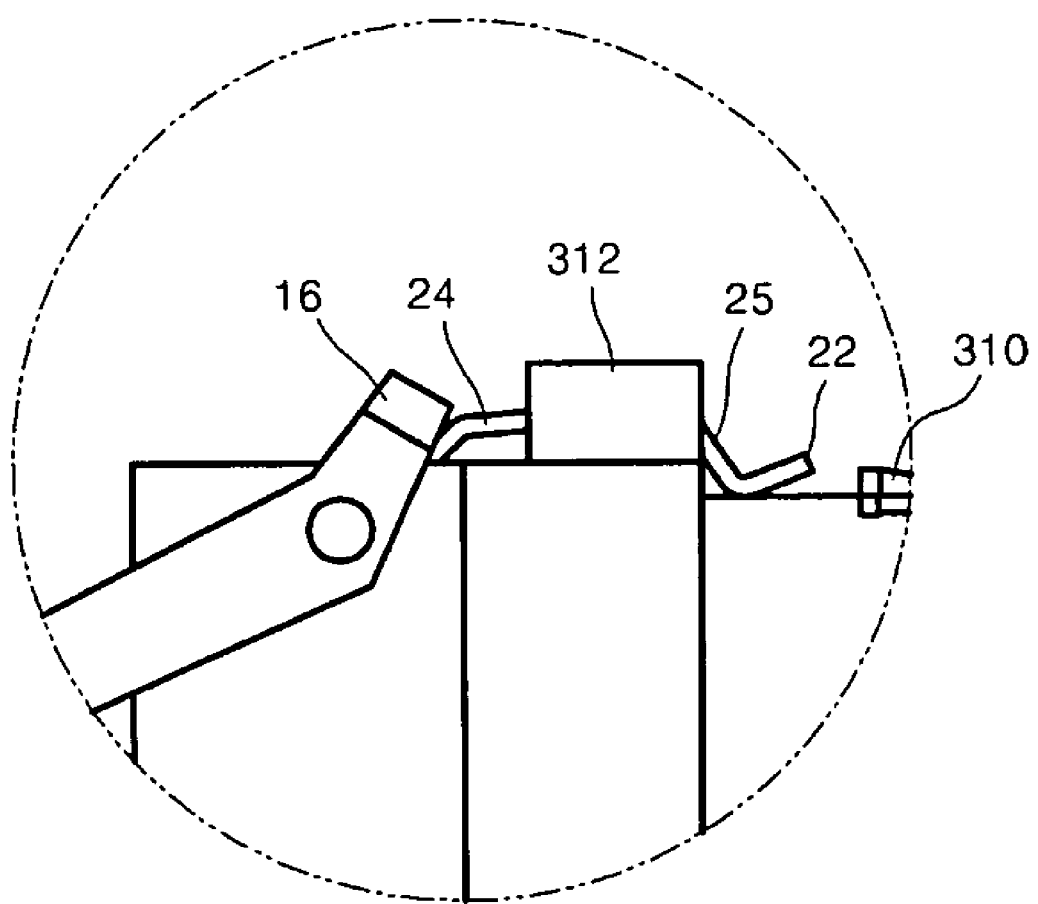
FIG. 8 illustrates the operation of a rotary lever and an elastic arm in the state shown in FIG. 7.

FIG. 7 illustrates a state where the pluggable optical transceiver module 100 shown in FIG. 6 is being removed from the system platform. FIG. 8 illustrates the operation of the rotary lever 10 and the elastic arm 20 in the state shown in FIG. 7. FIGS. 7 and 8 are views from the bottom.

When the pluggable optical transceiver module 100 is removed from the receptacle 600 of the system platform, the pressing portion 16 of the rotary lever 10 contacts and pushes the first inclining plane 24 of the elastic arm 20 and the first plane 21 of the elastic arm 20 moves forward within a range permitted by the groove 311 of the housing frame 30 and then stops. As a result, as shown in FIG. 8, the elasticity of the elastic arm 20 is transformed to push up the clamp 501 including the opening 602 of the receptacle 600 and the clamp 601 is separated from the coupling protrusion 310 of the housing frame 30 so that the pluggable optical transceiver module 100 is easily removed from the receptacle 600. When any force is not applied to the rotary lever 20, the elastic arm 20 returns to the original shape.

Figure 9:
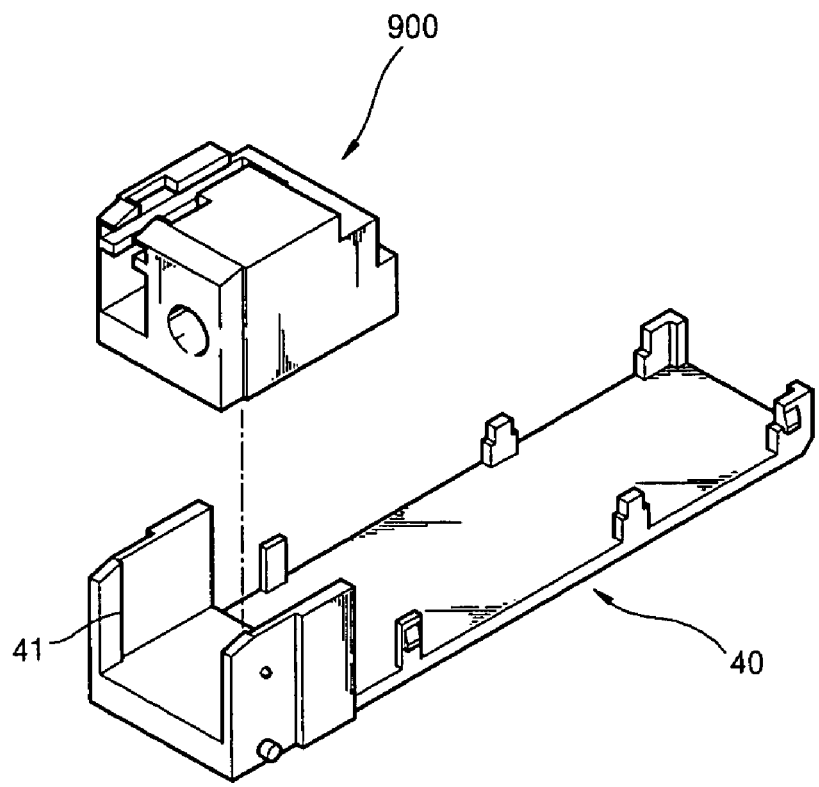
FIG. 9 illustrates a housing frame according to an embodiment of the present invention.

FIG. 9 illustrates a housing frame that can be used in the pluggable optical transceiver modules 100 and 500 shown in FIGS. 1 and 5, according to an embodiment of the present invention. Referring to FIG. 9, the housing frame is divided into a housing base 40 and an optical receptacle 900 receiving a single LC fiber connector therein. The optical receptacle 900 for receiving the single LC fiber connector may be installed on a mount 41 of the housing base 40. In other words, the optical receptacle 900 may be removed from the mount 41 and then another type of optical receptacle may be installed on the mount 41 to receive another type of fiber connector.

Figure 10:
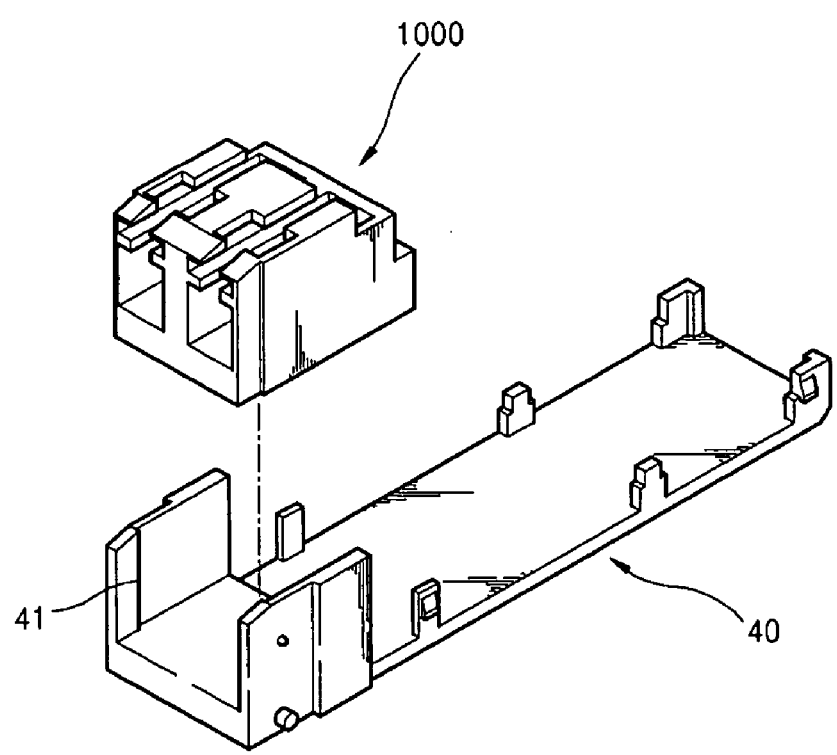
FIG. 10 illustrates a housing frame according to another embodiment of the present invention.

FIG. 10 illustrates a housing frame that can be used in the pluggable optical transceiver modules 100 and 500 shown in FIGS. 1 and 5, according to an embodiment of the present invention. Referring to FIG. 10, the housing frame is divided into the housing base 40 and an optical receptacle 1000 receiving a dual LC fiber connector therein. The optical receptacle 1000 for receiving the dual LC fiber connector may be installed on the mount 41 of the housing base 40. In other words, the optical receptacle 1000 may be removed from the mount 41 and then another type of optical receptacle may be installed on the mount 41 to receive another type of fiber connector.

Figure 11:
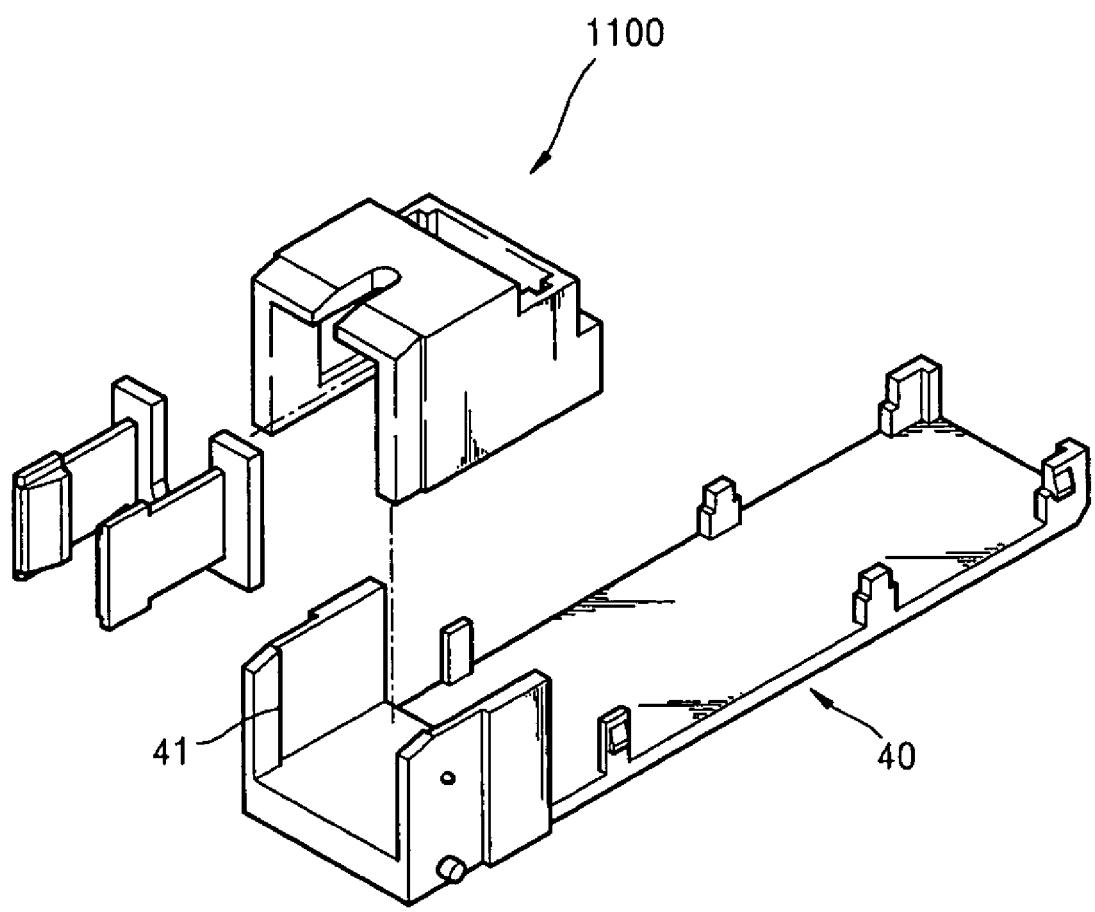
FIG. 11 illustrates a housing frame according to still another embodiment of the present invention.

FIG. 11 illustrates a housing frame that can be used in both of the pluggable optical transceiver modules 100 and 500 shown in FIGS. 1 and 5, according to an embodiment of the present invention. Referring to FIG. 11, the housing frame is divided into the housing base 40 and an optical receptacle 1100 receiving an SC fiber connector therein. The optical receptacle 1100 for receiving the SC fiber connector may be installed on the mount 41 of the housing base 40. In other words, the optical receptacle 1100 may be removed from the mount 41 and then another type of optical receptacle may be installed on the mount 41 to receive another type of fiber connector.

Referring to FIGS. 9 through 11, the housing frames 30 and 30' shown in FIGS. 1 and 5, respectively, can be implemented by the housing base 40 and the optical receptacle 900 for receiving the single LC fiber connector, the optical receptacle 1000 for receiving the dual LC fiber connector, or the optical receptacle 1100 for receiving the SC fiber connector. Only three types of connector have been described with reference to FIGS. 9 through 11, but various other types of fiber connector such as an MT-RJ fiber connector, a BNC/TNC fiber connector and a fiber channel or a fiber pigtail may be connected in embodiments of the present invention.

As described above, the present invention can provide a housing frame to which different types of optical receptacle can be installed according to various types of fiber connector, thereby allowing diverse pluggable optical transceiver modules to be developed with minimized additional parts.

According to the present invention, an elastic arm and a rotary lever are provided so that a pluggable optical transceiver module can be easily fitted to and removed from an system platform. In addition, for a pluggable bidirectional optical transceiver module that can be effectively used in an optical access network system in which many optical transceiver modules are installed, an assembly including an LED display and a method of operating the same are provided, so that a user can visually check the normal or abnormal connection state of power supply and can ensure steady connection when a pluggable optical transceiver module is fitted to a receptacle of a system board. In addition, during the operation, states of transmission function and receiving function can be displayed. Moreover, in the present invention, a housing frame that can be dissembled is provided so that a pluggable optical transceiver module can receive various types of fiber connector and optical element therein.

Since a large number of bidirectional optical transceiver modules are used in a passive optical network (PON) system and a terminal for a fiber-to-the-home (FTTH) a pluggable optical transceiver module according to the present invention is cost effective to maintain and to repair the PON system and the terminal unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pluggable optical transceiver module comprising:
a housing frame having an adaptor at which an optical transceiver element is installed;
a rotary lever comprising a handle at one side and a pressing portion at another side;
a coupling protrusion formed on the modular housing frame for fixing the pluggable optical transceiver module to a receiving receptacle by way of a clamp on the receiving receptacle;
an elastic arm pivoted on the housing frame to be rotated by the rotary lever, the elastic arm comprising one end contacting the pressing portion according to rotation of the rotary lever and a second end coupled with or separated from the clamp of the receiving receptacle; and
wherein the rotary lever pressing portion pivots the elastic arm,
wherein the elastic arm moves laterally towards the coupling protrusion guided by a fixing sill and a second end of the elastic arm elastically bends and slants by a predetermined angle when the rotary lever pressing portion presses the one end of the elastic arm,
wherein the second end of the elastic arm becomes repulsive with respect to the clamp of the receptacle due to the slant, and
wherein the elastic arm de-couples the clamp of the receiving receptacle from the coupling protrusion allowing for removal of the pluggable optical transceiver module.

2. The pluggable optical transceiver module of claim 1, wherein the elastic arm rotates in a direction opposite to a direction in which the rotary lever rotates.

3. The pluggable optical transceiver module of claim 1, further comprising a coupling protrusion on a side of the housing frame on which the elastic arm is pivoted to be coupled with the clamp of the receptacle, wherein the clamp of the receptacle has an opening at a position where the coupling protrusion is placed when the pluggable optical transceiver module is fitted to the receptacle.

4. The pluggable optical transceiver module of claim 1, wherein a plane formed at the one end of the elastic arm contacts the housing frame, a plane formed at the other end of the elastic arm slants at a predetermine angle with respect to the housing frame, a center of the elastic arm is a plate spring in which an elastic portion is bended upward in a ladder shape, and an inclining plane extending from the one end of the elastic arm in the ladder shape is positioned to contact the pressing portion so that the inclining plane is pressed by the pressing portion.

5. The pluggable optical transceiver module of claim 4, wherein, when the inclining plane extending from at the one end of the elastic arm contacts and is pressed by the pressing portion, the other end of the elastic arm becomes repulsive with respect to the clamp of the receptacle due to the slant.

6. The pluggable optical transceiver module of claim 1, wherein planes formed at the ends, respectively, of the elastic arm contact the housing frame, a center of the elastic arm is a plate spring in which an elastic portion is bended upward in a ladder shape, and an inclining plane extending from the one end of the elastic arm in the ladder shape is positioned to contact the pressing portion so that the inclining plane is pressed by the pressing portion.

7. The pluggable optical transceiver module of claim 6, wherein, when the inclining plane extending from at the one end of the elastic arm contacts and is pressed by the pressing portion, the other end of the elastic arm rotates and slants by a predetermined angle with respect to a direction the elastic arm slides into the receptacle and becomes repulsive with respect to the clamp of the receptacle due to the slant.

8. The pluggable optical transceiver module of claim 7, wherein the housing frame comprises a fixing sill on which the elastic arm is pivoted and which is caught at an entrance of the receptacle when the pluggable optical transceiver module is fitted to the receptacle.

9. The pluggable optical transceiver module of claim 1, wherein the housing frame comprises:
  a housing base; and
  an optical receptacle that can be separated from the housing base and has an adaptor receiving a predetermined fiber connector therein to be coupled with the optical transceiver element.

10. The pluggable optical transceiver module of claim 9, wherein the optical receptacle is at least one among a single LC optical receptacle receiving a single fiber connector therein, a dual LC optical receptacle receiving a dual fiber connector therein, and an SC optical receptacle receiving an SC fiber connector therein.

11. The pluggable optical transceiver module of claim 1, further comprising a driving circuit board connected to a terminal of the optical communication system body to control operations of the optical transceiver element.

12. The pluggable optical transceiver module of claim 11, further comprising a display unit displaying a state of connection between the driving circuit board and the terminal of the optical communication system body.

13. The pluggable optical transceiver module of claim 12, wherein the display unit is inserted in an optical receptacle of the housing frame, which the display unit is comprised in a light emitting diode(LED), a light waveguide, and pins for electrical connection.

14. The pluggable optical transceiver module of claim 12, wherein the display unit consisted in light emitting diode (LED) is mounted on a circuit board, and the emitting light from the display unit display through a light waveguide inserted in the optical receptacle.

15. The pluggable optical transceiver module of claim 12, wherein the display unit displays the state of the connection based on intensity of a supply voltage generated when the terminal of the optical communication system body is connected with the driving circuit board.

16. The pluggable optical transceiver module of claim 12, wherein the display unit further displays an operating state signal generated from an optical transmitter or an optical receiver comprised in the optical transceiver element.

17. The pluggable optical transceiver module of claim 12, wherein the display unit consisted in light emitting diode (LED) is mounted on a circuit board, and the emitting light from the display unit display through a transparent optical receptacle unit itself.

* * * * *